Dec. 21, 1948.  S. L. LINDBECK  2,456,966
MOTOR SYNCHRONIZING SCHEMES
Filed March 13, 1947  2 Sheets—Sheet 1
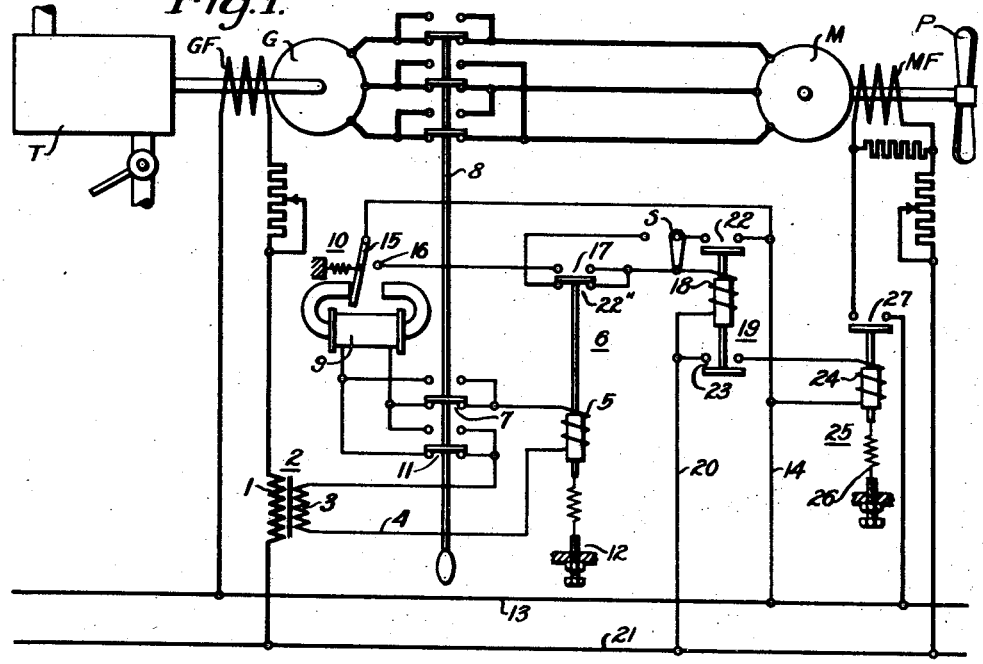
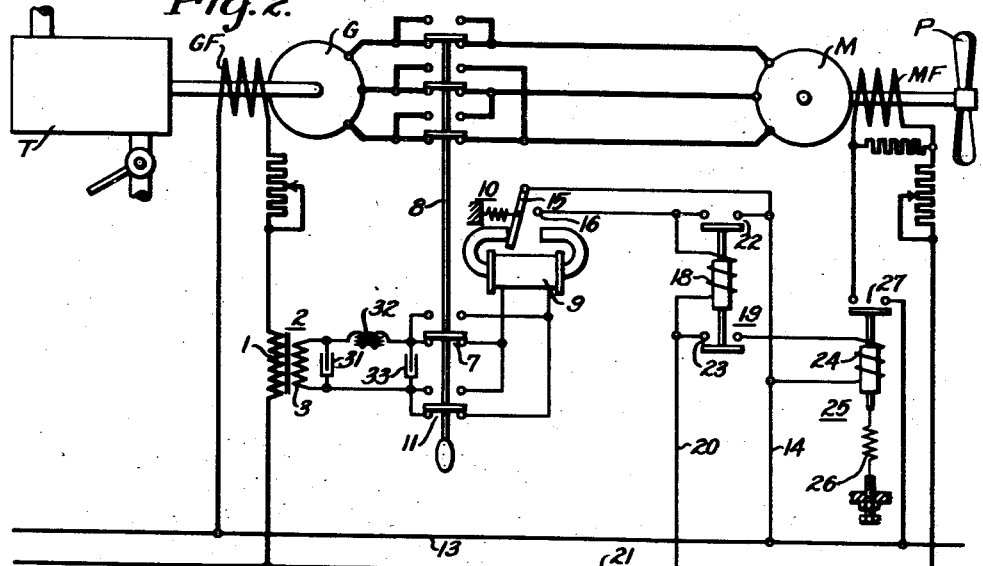
WITNESSES:
Robert O. Baird
Mw. L. Groove
INVENTOR
Simon L. Lindbeck.
BY
Paul E. Friedemann
ATTORNEY Dec. 21, 1948.   S. L. LINDBECK   2,456,966
MOTOR SYNCHRONIZING SCHEMES
Filed March 13, 1947   2 Sheets-Sheet 2

WITNESSES:
Robert C Baird
Nw. L. Groome

INVENTOR
Simon L. Lindbeck.
BY
Paul E. Friedmann
ATTORNEY

Patented Dec. 21, 1948

2,456,966

UNITED STATES PATENT OFFICE 2,456,966

MOTOR SYNCHRONIZING SCHEMES

Simon L. Lindbeck, Wilkinsburg, Pa., assignor to Westinghouse Electric Corporation, East Pittsburgh, Pa., a corporation of Pennsylvania Application March 13, 1947, Serial No. 734,356

8 Claims. (Cl. 318—148)

My invention relates to starting control systems for electric motors, and, more particularly, to systems of control for accelerating and synchronizing synchronous motors.

One broad object of my invention is to synchronize a synchronous motor with maximum pull-in torque.

There are many synchronous motor applications, as in ship propulsion, certain mills, etc., where the sole load, or at least the major load, on the generator of alternating current is a single synchronous motor. On some ship drives having a plurality of propellers, each propeller driving motor is supplied with electric energy from a single alternator having only a slightly greater capacity than the particular motor constituting its load.

My invention is particularly applicable to a type of drive where the motor and generator are the only main interconnected units involved.

One specific object of my invention is the provision of synchronizing means for a salient pole synchronous motor, to effect synchronization at the proper instant to obtain maximum pull-in torque in response to an operating characteristic in the field winding of the generator supplying the energy to the synchronous motor.

A further specific object of my invention is the provision for determining the proper instant to synchronize a salient pole synchronous motor by means of a relay operated by the alternating-current component in the field circuit of the generator supplying alternating current to the motor, where this is readily possible as is the case where a synchronous motor comprises the entire substantially full load, or at least the major portion of the full load of the generator.

The most pertinent example of synchronous motor applications which frequently employ only one synchronous motor on each generator bus are marine propulsion drives.

In this type of drive, the practice in the past has been to use manual control for the starting operation. For ordinary operation in this type of application, manual control is reasonably satisfactory since the starting torque is fairly moderate. However, when a "crash stop," that is, a maneuver from full speed ahead to full speed astern, is attempted, considerable skill is required on the part of the operator in synchronizing the motor.

One broad object of my invention is to improve the synchronization of a synchronous motor where such motor comprises the principal load of a generator.

Other objects and advantages will become more apparent from a study of the following specification and the accompanying drawings, in which:

Figure 1 is a diagrammatic showing of one embodiment of my invention;

Fig. 2 is a diagrammatic showing of a modification of my invention; and

Figure 3:
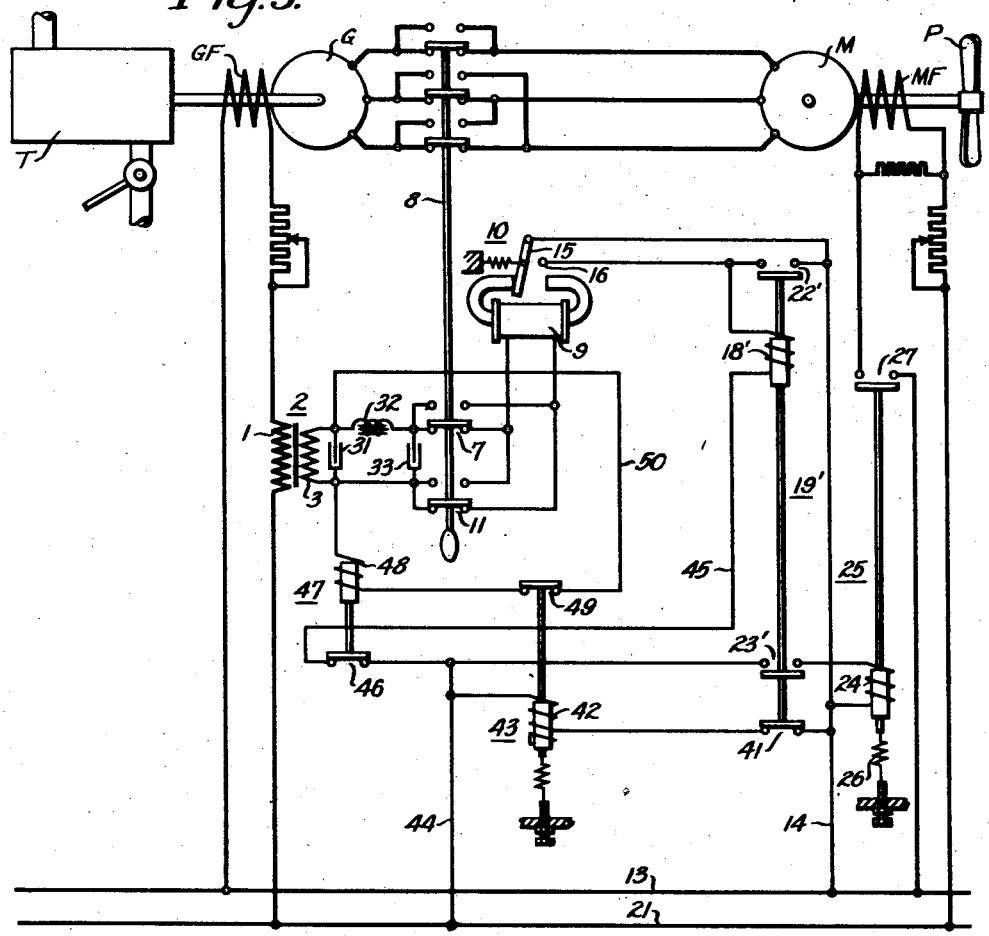
Fig. 3 is a further modification of my invention.

In Figures 1 and 2, the prime mover for the generator G is represented by the turbine T. It is, of course, apparent that any suitable prime mover may be used. The synchronous motor M, coupled to drive the load, as a ship propeller P, is disposed to be connected, by the circuits shown, to the generator G through the reversing switch 8.

The generator field winding GF, through a suitable rheostat and the primary winding 1 of the transformer 3 is connected to the direct-current buses 13 and 21, and the motor field winding MF, is disposed to be connected to the direct-current buses 13 and 21 by means of the field switch 25.

An actual ship propulsion control is considerably more complicated than shown in Figs. 1 and 2, but I have selected only such portions of the main propulsion control as are essential to illustrate my invention.

It is known to electrical engineers that the phase position of a synchronous motor rotor, usually carrying the motor field windings, as MF, at the instant of the application of the field current, namely, the instant field switch 25 closes, determines the synchronizing torque available. Thus, a device which will determine the optimum phase position, or at least avoid the worst phase position, will quite materially increase the pull-in torque and thus the dependability of synchronization.

When a synchronous motor is running at low slip, which is the case when the motor is running at its balanced or substantially balanced induction motor speed, cyclic variations of armature current are produced by the difference between the direct and quadrature axis reactances of the motor. These cyclic variations of current flowing in the generator G induce corresponding variations in the generator field GF. It is this alternating-current component in the generator field GF that I utilize to control the synchronizing operation.

Since the variations of the generator field current are produced by the salient poles of the motor passing into and out of the direct axis position of the motor, the frequency and phase position of the generator field current variations are an indication of the slip frequency and phase position of the motor rotor.

My systems of control select the proper slip frequency and phase position at which the motor M is to be synchronized. To best comprehend the merits of my invention, a study of a typical synchronizing sequence will be helpful.

Let the assumption be that the turbine T is operating at the proper speed; the generator field GF is fully excited; the reversing switch 8 is in the position shown; the motor field switch 25 is open, as shown; and that the motor M is operating its load at substantially balanced induction motor speed. Under these conditions, the slip speed is low and the frequency of the alternating-current component in the generator field GF is rather low. Since the primary winding 1 of the transformer 2 is in the generator field circuit, an alternating-current flows in the circuit that may be traced from the secondary 3, conductor 4 (referring to Fig. 1), the actuating winding 5 of the frequency responsive relay 6, the back contacts 7 of the reversing switch 8, the actuating coil 9 of the polarized relay 10, back contacts 11 of the reversing switch 8 to the secondary 3 of the transformer 2.

The frequency relay 6 is provided with adjustable spring means 12 and is otherwise so designed to accurately select the frequency at which this relay will operate. During acceleration of motor M, this relay 6 will not operate at all so that contacts 17 remain open, but at a given low slip of the motor M this relay will close contacts 17 and open its contacts 22″ during each current impulse in the winding 5.

Since the relay 10 is a spring biased polarized relay, the armature will be actuated only to the right at a particular current value in coil 9 and during that portion of an alternating-current cycle having a given polarity. This means that contacts 16 will only be closed when the field poles of the motor are in proper, or substantially proper, position to obtain maximum pull-in torque.

The first time the field poles are in proper position for synchronization and the slip frequency is at a given low value, both contacts 16 and 17 are closed to establish a circuit from the positive bus 13, through conductor 14, armature 15, contacts 16 and 17, actuating coil 18 of the control relay 19, and conductor 20 to the negative bus 21.

Relay 19 is selected to operate almost instantly upon energization of its coil 18. Operation of this relay 19 causes the closing of its contacts 22 and 23. Closing of contacts 22 establishes a holding circuit for coil 18, whereas the closing of contacts 23 establishes a circuit from bus 13 through conductor 14, actuating coil 24 of the field contactor 25, contacts 23, and conductor 20 to the negative bus 21.

Field contactor 25 is of the instantaneous type but nevertheless is provided with adjustable spring means 26 to provide for a small alteration of its time constant. By suitable selection of relay 19 and adjustment of the field contactor 25, the excitation of the motor field MF by the closing of contacts 27 may be selected so as to take place at exactly the instant to obtain maximum pull-in torque.

While the relay 19 is selected of the instantaneous type, it is apparent that its drop-out would not occur instantaneously. After synchronization is complete, the relay 6 again takes the position shown in Fig. 1. The holding circuit for coil 18 may thus be selected by appropriate positioning of switch S to include contacts 22″ and the circuit shown. If the motor M pulls out for any reason, the holding circuit will be broken at contacts 22″ and then resynchronization may take place exactly as original synchronization. Pull-out is not likely to occur in ship drives but where my system of control is applied, say to a cement mill, pull-out may occur.

The modification shown in Fig. 2 does not differ very materially from the embodiment shown in Fig. 1, except that I do not utilize the frequency responsive relay 6. To obtain the same useful function provided by relay 6, I utilize a capacitor 31 connected directly across the secondary terminals of the transformer 2 and utilize a reactor 32 and capacitor 33 connected in series, both connected in parallel to the capacitor 31.

During acceleration of the motor M, while the frequency of the current from secondary 3 is high, the capacitor reactor arrangement bypasses all the current supplied by the transformer. At a low slip frequency suitable for synchronization, an energizing circuit is established from the secondary 3 through reactor 32, contacts 7 of the reversing switch 8, actuating coil 9 of the spring biased polarized relay 10, and through contacts 11 back to the secondary.

When both the slip speed and the phase position are correct for synchronization with maximum pull-in torque, the armature 15 closes the contacts 16. The synchronization thus proceeds as for the control scheme shown in Fig. 1.

When the reversing switch 8 is thrown to its other position during reversing, the connection of coil 9 is also reversed to thus effect the same proper synchronization regardless of the direction of rotation of motor M.

In the modification shown in Fig. 3, special attention is given to a scheme for effecting resynchronization in the event of a pull-out. When the direct current buses 13 and 21 are energized, a circuit is established from bus 13 through conductor 14, back contacts 41 of the relay 19′, actuating coils 42 of the time limit relay 43 and conductor 44 to bus 21. The contacts 49 are thus opened and the actuating coil 48 of relay 47 can not be energized when a low frequency output voltage appears at the terminals of transformer secondary 3. An energizing circuit will, however, be established from the transformer secondary 3 through the reactor 32, contacts 7, coil 9 of the polarized relay 10, and contacts 11 back to the secondary 3.

The polarized relay 10 thus intermittently closes the circuit at the armature 15 and contact 16. This operation establishes a circuit, at a low frequency and the proper pole position of the motor M, from conductor 14, through the armature 15, contact 16, actuating coil 18′ of the relay 19′, conductor 45, contacts 46 of the control relay 47 to energized conductor 44.

The relay 19′ is thus operated to close contacts 23′ to energize the field contactor 25. Operation of the relay 19′ closes contacts 22′ to establish a holding circuit for relay 19′. Contacts 41 are also opened to deenergize the time limit relay 43. Since this relay 43 has an appreciable time constant, its contacts will remain open till the synchronization is completed. After synchronization is completed, there is no voltage at the secondary terminals with the result that relay 47 remains in the position shown despite the closing of contacts 49.

In the event of pull-out an alternating voltage again appears at the secondary terminals of transformer 2. Control relay 47 is thus energized by a circuit from the lower terminal of the secondary 3 through the actuating coil 48 of relay 47, contacts 49, and conductor 50 to the upper secondary terminal.

Operation of relay 47 opens the holding circuit for relay 19' at contacts 46. Relay 19' drops out closing contacts 41, to thus energize the time limit relay 42. The time limit relay 43 opens contacts 49 to deenergize relay 47. Conditions are thus established for re-synchronization.

While I have shown but two schemes of control, I am aware that others, particularly after having had the benefit of my disclosure, may devise similar schemes for accomplishing the same or substantially the same results. I, therefore, do not wish to be limited to the exact circuit arrangements shown, but wish to be limited only by the scope of the claims hereto appended.

I claim as my invention:

1. A starting control for a synchronous motor, in combination, an alternator driven at a selected speed by a suitable prime mover, a source of direct current, a field winding for the alternator connected to said source of direct current, a synchronous motor of a size to constitute the main load for the alternator connected to the alternator, a field winding for the synchronous motor, electromagnetic switching means for connecting the motor field windings to said source of direct current, and means responsive to the frequency and phase position of the alternating-current component in the alternator field winding for controlling the operation of said electromagnetic switching means.

2. A starting control for a synchronous motor, in combination, an alternator driven at a selected speed by a suitable prime mover, a source of direct current, a field winding for the alternator connected to said source of direct current, a synchronous motor of a size to constitute the main load for the alternator connected to the alternator, a field winding for the synchronous motor, electromagnetic switching means for connecting the motor field windings to said source of direct current, and a frequency responsive relay interconnected with the field winding of the alternator for controlling the operation of the electromagnetic switching means.

3. A starting control for a synchronous motor, in combination, an alternator driven at a selected speed by a suitable prime mover, a source of direct current, a field winding for the alternator connected to said source of direct current, a synchronous motor of a size to constitute the main load for the alternator connected to the alternator, a field winding for the synchronous motor, electromagnetic switching means for connecting the motor field windings to said source of direct current, a frequency responsive relay interconnected with the field winding of the alternator, a spring-biased polarized relay also interconnected with the field winding of the alternator, and means for effecting the operation of said electromagnetic switching means at the instant of synchronized operation of said frequency relay and polarized relay.

4. A starting control for a synchronous motor, in combination, an alternator driven at a selected speed by a suitable prime mover, a source of direct current, a field winding for the alternator connected to said source of direct current, a synchronous motor of a size to constitute the main load for the alternator connected to the alternator, a field winding for the synchronous motor, electromagnetic switching means for connecting the motor field windings to said source of direct current, a relay responsive to the frequency and polarity of the alternating-current component in the alternator field winding, and means responsive to the operation of said relay for effecting the operation of said electromagnetic switching means.

5. A starting control for a synchronous motor, in combination, an alternator driven at a selected speed by a suitable prime mover, a source of direct current, a field winding for the alternator connected to said source of direct current, a synchronous motor of a size to constitute the main load for the alternator connected to the alternator, a field winding for the synchronous motor, electromagnetic switching means for connecting the motor field windings to said source of direct current, relay means responsive to the frequency and polarity of the alternating-current component in the alternator field winding for controlling the operation of said electromagnetic switching means.

6. A starting control for a synchronous motor, in combination, an alternator driven at a selected speed by a suitable prime mover, a source of direct current, a field winding for the alternator connected to said source of direct current, a synchronous motor of a size to constitute the main load for the alternator connected to the alternator, a field winding for the synchronous motor, electromagnetic switching means for connecting the motor field windings to said source of direct current, a transformer having a primary winding in the field circuit of the alternator field winding, and having a secondary winding, and relay means responsive to the frequency and polarity of the secondary winding for controlling the operation of said electromagnetic switching means.

7. A starting control for a synchronous motor, in combination, an alternator driven at a selected speed by a suitable prime mover, a source of direct current, a field winding for the alternator connected to said source of direct current, a synchronous motor of a size to constitute the main load for the alternator connected to the alternator, a field winding for the synchronous motor, electromagnetic switching means for connecting the motor field windings to said source of direct current, a transformer having a primary winding in the field circuit of the alternator field winding, and having a secondary winding, a frequency responsive relay and a spring biased polarity responsive relay connected to said secondary winding, and means responsive to the synchronized operation of said two relays for effecting the operation of said electromagnetic switching means.

8. A starting control for a synchronous motor, in combination, an alternator driven at a selected speed by a suitable prime mover, a source of direct current, a field winding for the alternator connected to said source of direct current, a synchronous motor of a size to constitute the main load for the alternator connected to the alternator, a field winding for the synchronous motor, electromagnetic switching means for connecting the motor field windings to said source of direct current, a transformer having a primary winding in the field circuit of the alternator field winding, and having a secondary winding, a frequency responsive relay and a spring biased polarity responsive relay connected to said secondary winding, said frequency responsive relay having contacts that periodically close and open for each low frequency current impulse supplied by the secondary winding and said polarized relay and having contacts that close when the current supplied to the polarized relay by the secondary winding has a given magnitude and phase relation to the alternator armature current, and means responsive to the concurrent closing of the contacts of the two relays for effecting the operation of said electromagnetic switching means.

SIMON L. LINDBECK.

REFERENCES CITED

The following references are of record in the file of this patent:

UNITED STATES PATENTS

| Number | Name | Date |
|---|---|---|
| 1,934,529 | Forbes | Nov. 7, 1933 |